Oct. 10, 1972    J. F. BUNKER ET AL    3,697,329
RADIOISOTOPE HEAT SOURCE SYSTEM
Filed June 4, 1971    3 Sheets-Sheet 1

INVENTORS
JAMES F. BUNKER
JAMES E. POLAND
EMERSON H. SAYELL
GEORGE V. SCHMIDT

BY

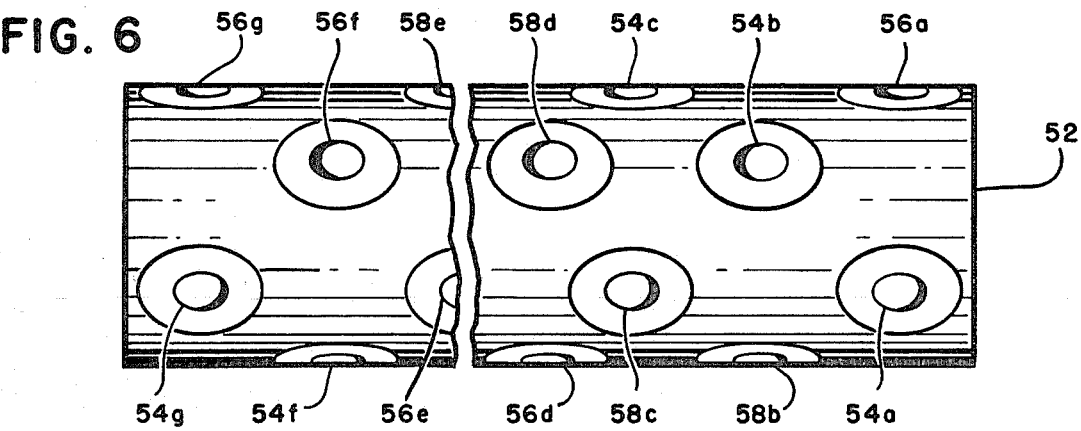
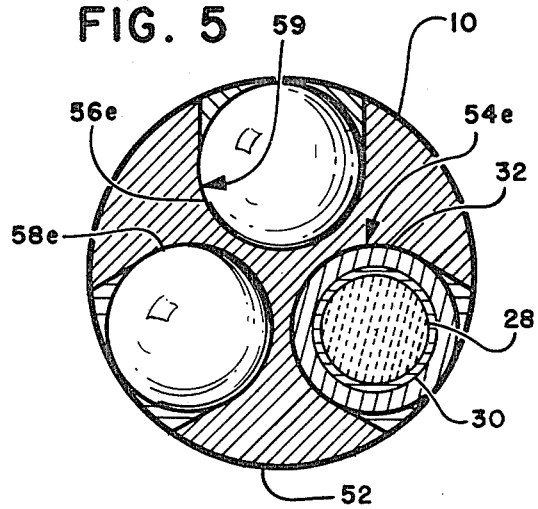
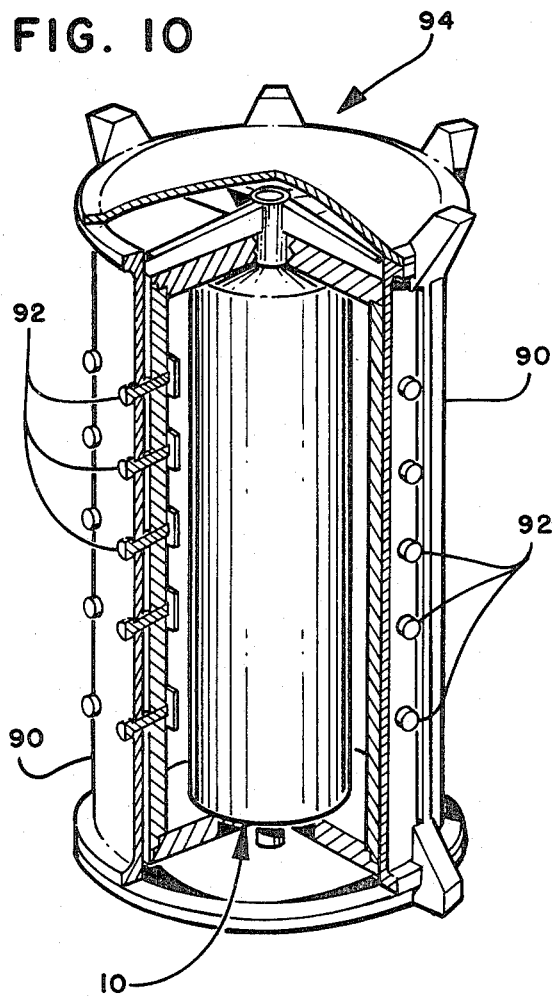

3,697,329
RADIOISOTOPE HEAT SOURCE SYSTEM
James F. Bunker, Malvern, James E. Poland and Emerson H. Sayell, Phoenixville, and George V. Schmidt, Norristown, Pa., assignors to the United States of America as represented by the United States Atomic Energy Commission
Filed June 4, 1971, Ser. No. 149,967
Int. Cl. G21h 1/10
U.S. Cl. 136—202                                    12 Claims

ABSTRACT OF THE DISCLOSURE

A radioisotope heat source system which comprises a plurality of radioisotopic heat source devices arranged helically or in offset levels about and within an elongated supporting member. The supporting member provides protection and effective heat utilization thereof. Additional protective and heat transfer layers may be provided about the heat source devices and supporting member along with means for utilizing heat produced thereby.

BACKGROUND OF INVENTION

Reliable, long life heat sources, particularly radioisotopic heat sources, have a wide range of uses in connection with space or other long term and remote or limited accessibility applications. Such heat sources may be used to provide thermal energy for electrical generating systems, including thermoelectric, thermionic, and Carnot cycle generators, and for direct or indirect heating of personnel or equipment.

There is an increasing need in such applications to raise the thermal energy produced by these heat sources to improve thermoelectric conversion efficiencies or to meet other system requirements. High thermal energies and consequently high temperatures present design restraints on the system, particularly with respect to material compatibilities, strengths and other factors which may be affected by these temperatures thus limiting thermal energy levels which may be used. This may become particularly critical as the operating life spans at these higher temperatures increase to meet other operation requirements. In addition, in space applications, the heat source may be subjected to reentry temperatures which, when added to the already high operating temperatures, and particularly after the heat source materials have been degraded over extended usage, may produce detrimental effects on the materials and structure of the heat source and cause failures thereof.

In addition to the thermal problems presented by such heat sources, the heat source must also be able to maintain its physical integrity under all environmental factors to which it may be subjected in order to prevent or minimize any undesirable radioactive hazard or environmental contamination. Such space heat sources thus must be capable of surviving not only long term operating (possibly in terms of years) and reentry (from seconds to minutes in time) thermal effects but also high mechanical stresses and strains resulting from reentry and impact upon the Earth or another body and other hazardous environments. After impact survival, the heat source may have a survive long term oxidation effects under high temperature conditions.

Space radioisotopic heat source reentry may be handled in a number of ways. For example, the heat source may be returned to Earth in a reentry vehicle or body surrounding the entire space vehicle or a portion of it including other apparatus than the heat source. The radioisotope in the heat source may then be recovered and reused or the like. Because of the high cost of reentry bodies or vehicles and their inherently large weight and size, this approach in many instances can be very costly, especially in those space vehicles where most, if not all, of the other apparatus in the vehicle may be disposable in terms of economics during reentry.

It would be advantageous to provide a relatively low cost and simple reentry body or vehicle for a radioisotopic heat source which automatically or inherently reaches a relatively slow impact velocity and is capable of surviving such impact without dispersal of radioactive isotopic materials. Such a capability is desired even after the heat source has been subjected to long term, high operating temperatures and high reentry temperatures.

SUMMARY OF INVENTION

In view the above, it is an object of this invention to provide a novel radioisotopic heat source system capable of producing high thermal energy, with inherently high impact resistance capabilities and with the ability to survive long term oxidation effects at elevated temperatures.

It is a further object of this invention to provide a ratioisotopic heat source system which may utilize relatively low cost and simple radioisotope fabrication and handling techniques for its production.

It is an additional object of this invention to provide a radioisotope heat source system using inherently high strength radioisotopic devices in an overall high impact resistant arrangement and which provides a maximum of thermal energy at relatively low radioisotope temperatures during operation.

It is a still further object of this invention to provide a radioisotopic heat source system which may be formed from inherently high impact resistant material configurations which may be used in high temperature environments.

It is a further object of this invention to provide a radioisotopic heat source system which is of inherently low, free-fall velocity configuration.

Various other objects and advantages will appear from the following description of the invention, and the most novel features will be particularly pointed out hereinafter in connection with the dependent claims. It will be understood that various changes in the details, materials and arrangement of the parts, which are herein described and illustrated in order to explain the nature of the invention, may be made by those skilled in the art.

The invention comprises an arrangement of preferably spherical radioisotope heat source devices disposed generally helically about an elongate support member (preferably cylindrical or tubular) and positioned in bores extending inwardly from the periphery of the support member, with means for containing and conveying heat produced by the heat source devices.

DESCRIPTION OF DRAWING

The present invention is illustrated in the accompanying drawing wherein:

FIG. 5 is a cutaway view along lines 5—5 of FIG. 4 showing details thereof;

FIG. 6 is a segmented elevation view of an alternate heat source device support;

FIG. 10 is a partially cutaway perspective view of a heat source arrangement and utilization system.

DETAILED DESCRIPTION

Figure 1:
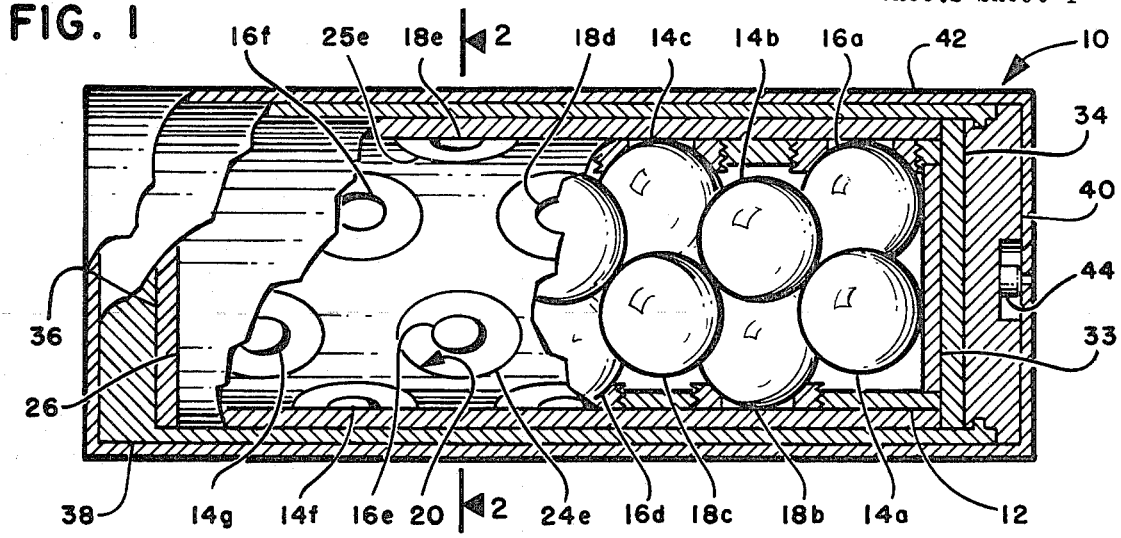
FIG. 1 is a partially cutaway elevation side view of a heat source arrangement incorporating features of this invention.
Figure 2:
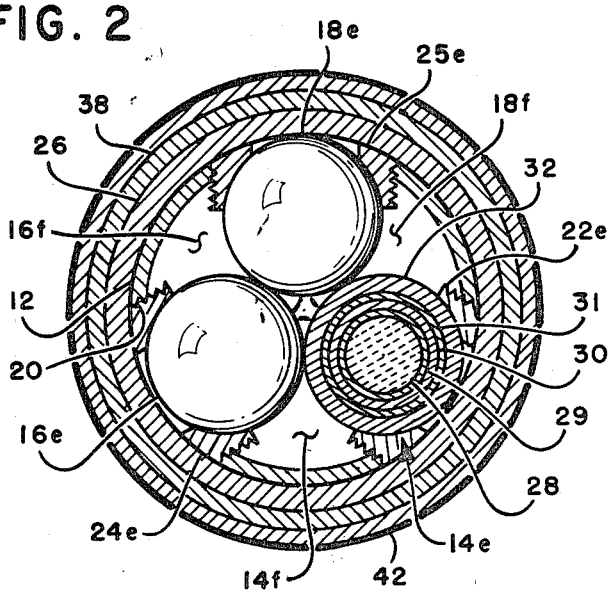
FIG. 2 is a partially cutaway view along lines 2—2 of FIG. 1 showing the arrangement of the heat source devices and details thereof.

A heat source arrangement 10 is shown in FIGS. 1 and 2 for surviving long term, high temperature operating environments (2000° F. and above) without detrimental effect to the desired heat output produced thereby, and even after such long term use, for surviving high temperatures and shocks (3000° F. to 4000° F. and above and 100,-000 lb.-ft. impact energy and 400 feet per second impact velocity) resulting from space reentry conditions and Earth impact, or the like, and for resisting subsequent long term oxidation or other environments under high temperature (1000° F. to 2000° F.) conditions.

As shown, the heat source arrangement 10 includes a tubular supporting member or ring 12 which is adapted to receive and support radioisotopic heat generating means constructed and formed in a desired manner to provide these operating characteristics. The heat generating means shown includes a plurality of spherical, radioisotopic heat source devices, each positioned with at least two others in a plurality of levels or layers rotatively offset or staggered from adjacent levels with devices in adjacent levels arranged in a helical manner about member 12. In the embodiment shown, these spherical heat source devices are arranged in a plurality of offset levels with three heat source devices in each level, which may be considered as three helically spiraling rows about a longitudinal axis. The first row is shown by devices 14a, 14b, 14c, 14f and 14g (the other devices of the row being on the back side of member 12), a second row of devices 16a, 16d, 16e and 16f, and a third row of devices 18b, 18c, 18d and 18e. Each spherical heat source device is positioned within a radial or otherwise disposed recess or passageway extending through member 12 resting against the adjacent devices in the same level of devices and two of those in adjoining levels. A typical passageway and location of heat source devices therein is shown by passageway 20 in FIG. 2 for heat source device 16e and by the corresponding passageways for devices 14e and 18e. Each of the heat source devices may be held in position within its respective passageway in member 12 by the location of adjacent heat source devices and by a suitable plug, such as shown by plug 22e for heat source device 14e and plugs 24e and 25e for heat source devices 16e and 18e respectively. Each of the plugs may be screwed into or otherwise attached or fastened to the appropriate passageway of member 12 or be press fitted thereinto and held in place by suitable enclosing members, such as by insulating sleeve 26. A portion of each heat source device may be left exposed, as shown, by a central opening or passageway in the plugs so as to facilitate heat transfer from the heat source device to the utilization system.

It will be understood that any number of helical rows and offset angles between levels of heat source devices may be used with any number of heat source devices disposed within a row and level, depending upon the desired heat output of the system and other requirements thereof. For example, the weight of the heat source arrangement may be minimized by utilizing the largest spherical or otherwise configured heat source devices consistent with any diameter limits on member 12. Greater randomness of devices positioning, and consequent increased impact resistance, may be achieved by selecting an appropriate number of heat source devices for each level and row and the angle of the helix or offset between rows to maximize the number of levels which may be used before a heat source device of one level is axially aligned with a heat source device of another level. In the embodiment shown in FIGS. 1 and 2, the offset or helix angle is 45° so that heat source devices of alternating levels are in alignment axially. With an offset or helix angle of 60°, nine levels of heat source devices with three devices in each level would be required before two devices would be in axial alignment. For a heat source arrangement having four heat source devices in each level, maximum randomness may be achieved with an angle of offset of 30°. Generally, arrangements using three or four heat source devices at each level at angles of offset between 30° and 60° are preferred to provide optimum weight, size, strength and thermal characteristics.

The randomness achieved by the location of the heat source devices may reduce the total energy imparted to each heat source device by minimizing impact multiplication which may occur between aligned devices or spheres along the impact vector and by smearing or diffusion of impact forces.

Also, with this arrangement of heat source devices located in passageways extending through member 12, the loci of device centers generate helices within supporting member 12 closer to the surface of member 12 than to its central axis, thus approximating an annular fuel element or envelope. Since the average fuel amount is closer to the external surface of member 12, a relatively small radial temperature differential may be maintained within member 12.

As shown, each of the heat source devices includes a spherical core of radioactive isotopic material surrounded by an oxidation resistant layer and an impact resistant layer, such as shown in FIG. 2 by core 28, oxidation resistant layer 30 and impact resistant layer 32 of heat source device 14e. The heat source devices may also include, depending upon materials used and operating conditions, one or the other or both of the diffusion or compatibility barrier layers 29 and 31 of such as molybdenum, refractory oxides and refractory carbides between core 28 and layer 30 and between layer 30 and layer 32. The layer 29, or an additional refractory oxide layer, may be used to provide dimensional compliance for the heat source devices to permit acceptance of various core sizes without affecting device outer diameter by adjusting layer thickness.

The core 28 of each heat source device may be appropriately formed from suitable radioactive isotopes, such as isotopes of plutonium, curium, strontium and actinium, which produce thermal energy from radioactive decay mechanisms. A particularly suitable radioactive isotope is that of plutonium-238 which has a relatively long half-life of 84.6 years, and which may be used in a number of different forms. Appropriate forms thereof include plutonium dioxide ($PuO_2$) and/or a substoichiometric plutonium dioxide having a formula of from about $PuO_{1.6}$ to about $PuO_{1.98}$. Using the plutonium in the oxide form chemically stabilizes the plutonium metal and elevates the fuel maximum service temperature. The substoichiometric form is less reactive to other materials. The plutonium dioxide, either in the stoichiometric or substoichiometric form, may be used alone or as a ceramic fuel with a refractory oxide such as thorium dioxide mixed therewith, as a cermet in which a metal matrix is deposited around plutonium dioxide particles with or without a refractory like thorium dioxide and then pressed into a solid form (the metal matrix may include such as molybdenum and alloys thereof or the like), or combinations of these in varying arrangements. Even though these various fuel forms of plutonium dioxide dilute the power density of the heat source fuel, they provide improved thermal conductivity, strength, chemical stability and the like properties.

The oxidation resistant layer 30 of each of the heat source devices, which functions as such during fabrication, ues and after any impact of the heat source devices, minimizes or prevents reactions between the radioactive isotopic material and surrounding materials and prevents dispersal thereof. Such an oxidation resistant layer preferably is made of a highly ductile material which will perform its functions after long life at high temperatures and after being subjected to shocks and high temperatures during reentry and impact, though the layer may be omitted where the properties of the radioisotopic core fuel or other operating requirements of the system permits. The time, temperature, and material interfaces to which the oxidation resistant layer 30 may be exposed contributes to possible degradation of the material, embrittlement, lowering of melting temperature, lessening of oxidation resistance and other adverse effects. Layer 30 may be made of refractory oxides and of noble metals or alloys thereof which are pressed or otherwise formed about the radioactive isotope core 28. Typical layer 30 materials may include noble metals such as iridium, platinum, rhodium, rhenium and the like, noble metal alloys such as patinum-30 rhodium, platinum-iridium, and rhodium-iridium, and refractory oxides such as magnesium oxide, zirconium oxide and thorium oxide.

The impact resistant layers 32 serve to decelerate core 28 and layer 30 and to reduce stresses developed therein by spreading impact loads over a relatively large area of core 28 and layer 30. In the embodiment shown, the layers 32 are made of sufficient thickness to withstand the entire impact load to which the heat source arrangement may be subjected. Additional axial loading capabilities may be achieved by positioning an impact resistant disc at each end of member 12, such as shown by disc 33 where additional axial impact resistant strength is desired. Disc 33 may be made of materials similar to impact resistant layers 32. Layers 32 may be made of high strength material having suitable crush-up and thermal conductivity characteristics under high temperature environmental conditions. Such materials may include composite graphite made from woven or laid-up carbon or carbonizable threads or filaments or other forms thereof. Layers 32 may be formed by continuous and random windings about core 28 and layer 30 or by separate forming thereof in two sections which may then be threaded or otherwise fastened together about core 28 and layer 30. The material should be capable of operating in temperatures of 2000° F. and above for extended periods of time. Other high temperature and high strength materials, such as refractory oxides, may be used to perform the desired functions under the enumerated environmental conditions, for example, refractory oxides such as magnesia, hafnia, thoria, beryllia and zirconia and the like.

Figure 3:
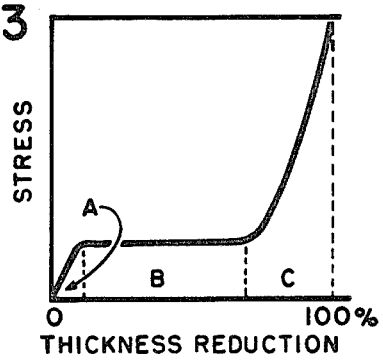
FIG. 3 is a graph of the stress-strength characteristic of a preferred heat source device impact resistance material.

A typical stress-strain characteristics of composite graphites is shown in FIG. 3 wherein A represents the elastic region, B represents the crush region, and C represents the bulk compression region. Composite graphites generally hold themselves together in region A and are thus able to absorb considerable impact energy during the compressing and crushing in regions B and C.

In order to provide more effective strength characteristics coupled with individual heat source device thermal and temperature characteristics, as well as the thermal and temperature characteristics of the overall arrangement, the heat source device spheres may be generally from about 0.5 to 2.5 inches in diameter, preferably about 1.5 inches in diameter, with a layer 30 thickness of from about 0.005 to 0.020 inch and a layer 32 thickness of from about 0.2 to 0.5 inch. A heat source device sphere of about 1.5 inches in diameter may produce from about 80 to 125 watts of thermal energy over the half-life of the plutonium radioisotope, or several decades of time, depending upon the amount of radioisotope disposed therein. Such a size sphere also provides a good balancing of strength and thermal characteristics.

The retaining plugs, such as plugs 22e, 24e and 25e, are preferably made of a material similar to impact resistant layer 32 to provide a good thermal and mechanical match therebetween. The plugs provide a heat path from heat source devices and present additional crush-up material in the event of "side-on" impact of the heat source arrangement. With appropriate contouring and fitting of interfacing surfaces of plugs and heat source devices and member 12, desirable load smearing behavior may also be achieved to further minimize loads applied to the radioisotope cores.

Elongate or tubular member 12 acts as a spacer and matrix material to locate and retain the spherical heat source devices in the desired geometrical arrangement, and partially as an impact energy absorber. Member 12 may be made of any appropriate material which provides these temperature and strength capabilities, such as materials like those used for impact resistant layers 32 or other materials like composite or polycrystalline graphites.

Because of the relatively low thermal conductivity and high thermal diffusivity of composite graphites, layers 32 and member 12 may provide thermal insulative protection of the spherical heat source devices. Such a function minimizes the amount of reentry insulation thickness required to provide protection for the heat source devices during the high thermal energy pulse produced during reentry, thus minimizing the required thickness for insulative sleeve 26 and end insulators 34 and 36, and possibly even eliminating the need for such in some instances. Insulators 26, 34 and 36 may be formed from low conductivity graphite (such as felt, foam or pyrolytic graphite) or other suitable material to provide an optimum balance between the operational and reentry temperatures of the heat source arrangement 10.

A rentry ablator sleeve or can 38 and an end cap or cover 40, appropriately fastened thereto, such as by the threads shown, may be positioned about cylindrical member 12 and insulators 26, 34 and 36 to provide the desired reentry ablation protection of the heat source arrangement. The ablator sleeve 38 and end cap 40 may be made of graphite or other appropriate material having a sufficient thickness to withstand the worst trajectory reentry heating and erosion or recession of ablator material.

Figure 7:
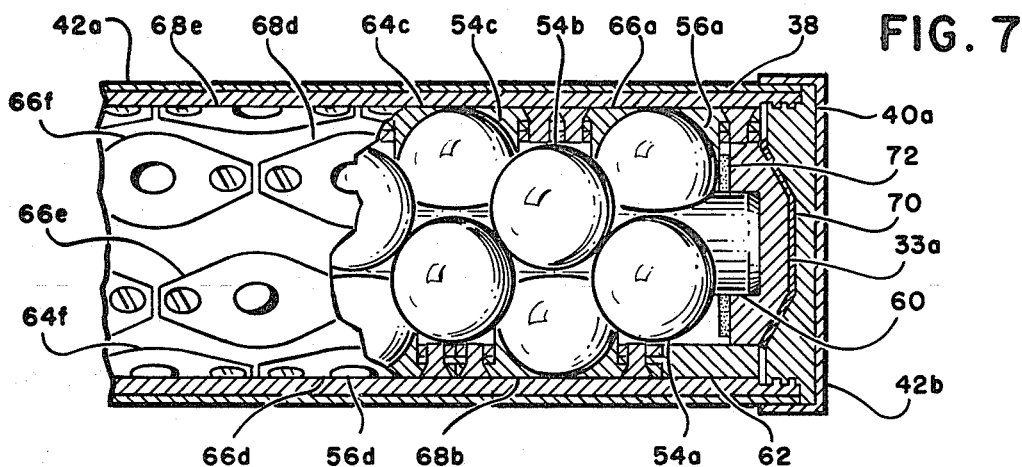
FIG. 7 is a segmented, partially cutaway side view of another embodiment of a heat source arrangement.

An exterior cladding 42 of tungsten carbide or the like may be placed about the ablator forming a sealed envelope for the entire heat source arrangement. This exterior cladding may be constructed of a sleeve 42a and two end caps 42b as shown in FIG. 7. The cladding 42 outer surface is preferably highly emissive (and may be coated for such) for efficient heat transfer to utilization devices disposed adjacent thereto while being oxidation resistant to protect the heat source arrangement internal components during handling and storage. Cladding 42 is the interface for structural integration of heat source and utilization means and is generally sealed to provide some helium back-pressure within the heat source for efficient heat transfer from the core 28 to the cladding 42, the helium pressure resulting from helium generated from alpha decay of radioactive isotope in heat source devices. Excessive helium build-up may be released through an appropriate vent 44 through cladding 42, if desired. The helium may migrate or otherwise pass from the radioisotope core 28 through inherent porosity of the heat source arrangement materials or through gaps provided between the respective filaments of the heat source arrangement and/or by suitable venting means therein.

Figure 4:
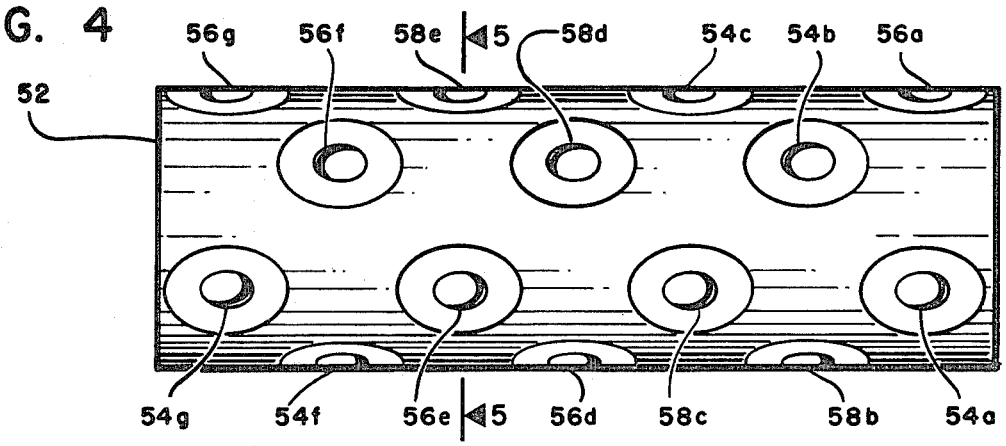
FIG. 4 is an elevation side view of another heat source device support embodiment.

FIGS. 4 and 5 illustrate another embodiment of the invention which provides certain improved thermal effects and some additional design flexibility over that of the embodiment shown in FIGS. 1 and 2, but with consequently increased weight. In this embodiment, the heat source arrangement includes a solid member 52 which may be cylindrical and adapted to receive and support a plurality of spherical radioactive heat source devices of the type shown in FIGS. 1 and 2 in similar offset level or helical positioning thereof. In this embodiment, the heat source devices are arranged in three helically spiraling rows, a first row shown by devices 54a, 54b, 54c, 54f and 54g, a second row of spherical devices 56a, 56d, 56e, 56f and 56g and a third row of devices 58b, 58c, 58d and 58e. The heat source devices are arranged at an offset or helical angle of 60°. Each of the heat source devices is positioned within a bore extending outwardly from locations near the longitudinal axis of member 12 and are spaced apart appropriate distances along the helical paths of the respective heat source device rows and levels. Such a bore is shown by bore 59 in FIG. 5 for heat source device 56e and by the corresponding bores for devices 54e and 58e. Each of the heat source devices may be held in position within its respective bore in member 52 by a suitable plug, similar to those shown with respect to FIGS. 1 and 2. The heat source devices may be made in the same manner as those described above and the member 52 enclosed in an appropriate insulative, ablative and cladding members shown in FIGS. 1 and 2.

Member 52, in addition to being a spacer and matrix material for the heat source devices can provide high thermal diffusivity to minimize temperatures thereat and to provide a thermal conductive path from the heat source devices to the exterior of the heat source arrangement during operation thereof. Member 52 may be made of the same material as tubular member 12 and impact resistant layers 32 and generally formed as a solid cylinder by suitable weaving or winding techniques from carbon filaments and the like and then holes drilled thereinto in a helical pattern to form the hemispherically bottomed bores for receiving heat source devices. It will be understood that with this embodiment, the impact resistant layers 32 may be reduced in thickness from those used in the embodiment of FIGS. 1 and 2 due to member 52 absorbing a portion of the impact forces. Also, with this arrangement, the heat source devices may be evenly spaced along the helical rows or they may be spaced at varying distances, such as shown by the decreasing spacing between heat source devices from the end to the center of member 52 in the embodiment of FIG. 6 to minimize shock level amplification or multiplication between heat source devices from end-on impact of the arrangement. Such spacing may also provide variations in the thermal output profile of the overall system.

The heat source devices described above with respect to FIGS. 1 and 4 may also be held in position by a central retainer post or rod 60, shown in FIG. 7, having generally hemispherical recesses therein for receiving and holding the heat source devices, as shown for example by representatively numbered devices 54a, 56a, 54b and 54c. The recesses may be appropriately positioned, together with suitable openings in tubular member 62 and retaining plugs 66a, 68b, 64c, 66d, 68d, 66e, 64f and 66f, to provide the desired offset levels and helical rows of heat source devices described above. The impact resistant disc 33a located at the end of the heat source arrangement may be appropriately shaped to receive and support retainer post 60 and provide the desired longitudinal impact resistance needed for "end-on" impacts. The reentry ablator end cap 40a may also be appropriately shaped to accommodate retainer post 60 and disc 33a and an appropriate cladding sleeve 42a and end cap 42b provided. Compliant or resilient pads 70 and 72 may be positioned between the respective parts of the heat source arrangement to provide a desired close fit after assembly of the arrangement. The retainer plugs, as shown, may be made with suitable ears extending from the periphery to receive appropriate screws or bolts or other fasteners to facilitate assembly and mounting of retainer plugs to tubular support member 62. It will be understood that the other end of the heat source arrangement may be provided with similarly shaped impact resistant discs and compliant pads adjacent the ablator sleeve 38.

Figure 8:
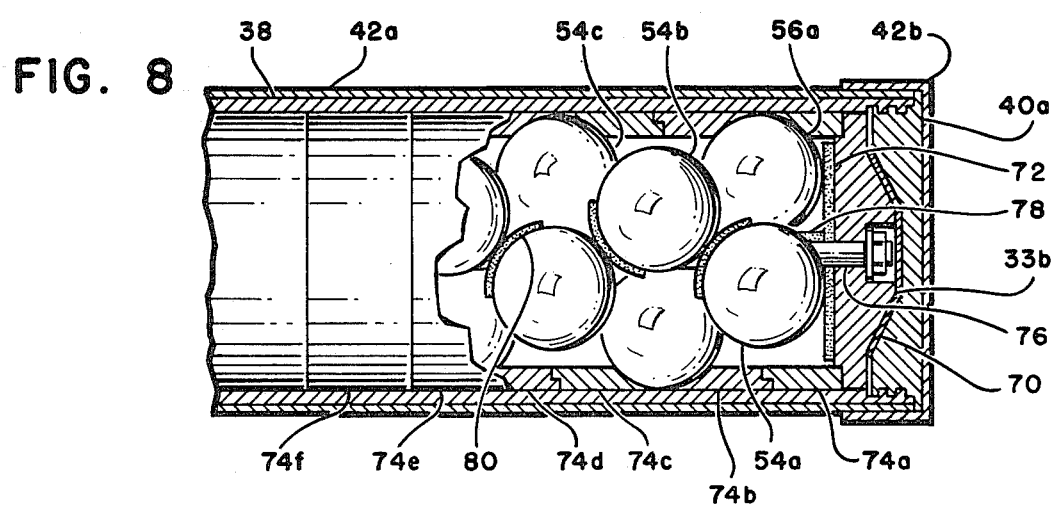
FIG. 8 is a segmented, partially cutaway side view of still another heat source arrangement.

The heat source arrangement can be further modified as shown in FIG. 8 providing a segmented tubular support member, including such as segments or rings 74a, 74b, 74c, 74d, 74e and 74f, having generally ovate recesses or annular grooves in each segment at the segment junctions or joints to receive the appropriate and representatively numbered heat source devices. The segment joints may be appropriately shaped with mating grooves, as shown, to provide additional strength and support. With such an arrangement, the heat source devices and segmented tubular element may be assembled by stacking them within the ablator can 38 beginning at one end. The segmented tubular support member may be held together between a suitably shaped impact resistant disc 33b at one end and a similar impact resistant disc (not shown) at the other end by a rod 76, and a compliant sleeve 78 disposed around the rod. Additional compliant or resilient pads or members 80 may be positioned between the respective heat source devices.

Figure 9:
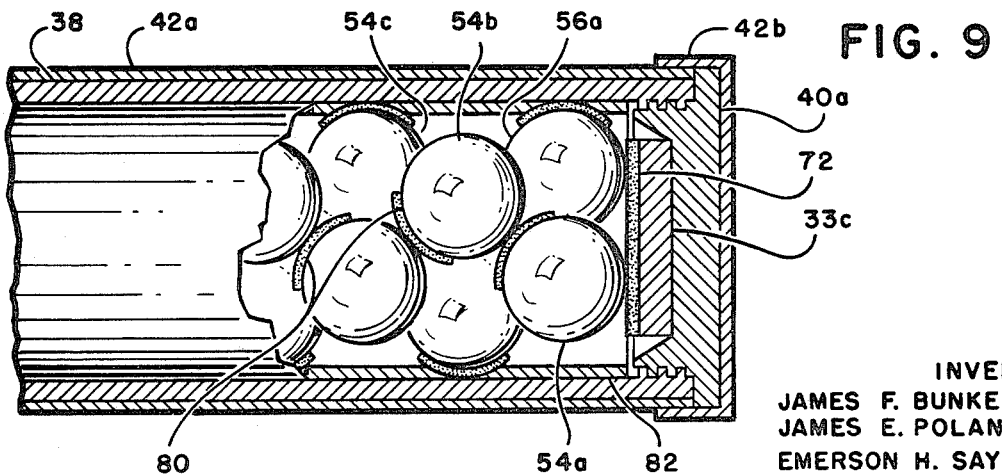
FIG. 9 is a segmented, partially cutaway side view of a modified heat source arrangement.

The representatively numbered heat source devices may also be positioned within a suitably shaped tubular member 82, as shown in FIG. 9, with recesses therein to receive the devices and compliant pads 80 to permit assembly of the heat source arrangement and to thereafter minimize movement of the heat source devices. The heat source devices and compliant pads may be positioned in the desired offset levels and helical rows in the recesses in tubular member 82 by press fitting the same using the compliant pads to maintain the rigidity of the arrangement.

It is noted, that the respective similarly functioning parts of the embodiment shown in FIGS. 7, 8 and 9 utilize the same or similar materials as those related above for the previously described embodiments. The compliant pads may be made of a compatible material, such as graphite, having an appropriate density and resiliency for a particular element and use.

It is noted above that it is generally preferred that the heat source arrangement utilize three or more spherical heat source devices at each level. When less than three heat source devices are used at each level, the overall arrangement may exhibit significant weight increases, increases in diameter and/or length, and decreased impact resistance when compared to an arrangement constructed in accordance with the embodiments described above, with a given thermal output.

There are a number of design and operating features which are provided by the subject invention. With member 12, member 52 and layers 32 and the like made from the preferred material graphite, the heat source arrangement provides a high temperature capability against embrittlement and loss of strength. Graphite may be supplemented or replaced by refractory oxides such as beryllia, alumina, or zirconia for member 12, member 52, and layers 32 to provide high temperature capability against oxidation or intermaterial diffusion. The high operating temperature capability of the preferred graphite permits more flexiblity in the reentry protection required and higher thermoelectric conversion efficiencies. Because of the overall configuration, the heat source arrangement may achieve a relatively low terminal velocity during reentry minimizing the impact resistance which must be provided by the various elements of the structure. This relatively low terminal velocity is a result of the higher drag coefficient of the elongate member. The heat source devices are preferably several, small, monolithic spheres which have inherently better impact capability than other configurations, and even better than large spheres. In addition, a spherical heat source device is orientation independent so far as impact resistance and thermal effects are concerned. Also, the arrangement of these spheres in a helical array about members 12 or 52 minimizes impact force amplification between spheres which may result from alignment of many spheres along the axis or vector of impact. Energy imparted to a sphere by any others will be reduced by lateral components of the impact vector. These features of impact resistance hold true for all incident angles of impact.

The overall design of the heat source arrangement also permits modularization and thermal profile tailoring within the heat source arrangement without changing the overall dimensions, shape or configuration thereof, e.g., the thermal loading of member 12 may be decreased by removing some of the spheres, or by rearranging the sphere array. In addition, fabrication of the individual heat source devices may be simpler and more reliable due to the spherical shape itself.

It will be understood that other heat source device spheres may be used in tubular or cylindrical or other similarly shaped members 12 and 52 (such as a prismatic or parallelepiped shape) if such is desired, however with some compromise of advantages enumerated above.

The heat source arrangement 10 may be appropriately mounted with any desired thermal energy utilization or converting means, such as a thermoelectric generator arrangement shown in FIG. 10. In this arrangement and system, heat source arrangement 10, is positioned centrally within a tubular or polygonal array of thermoelectric generator panels, such as shown by panels 90. Each of the panels includes a plurality of thermoelectric converters 92 which are connected to appropriate electric circuitry to convert the thermal energy radiation from heat source arrangement 10 to electrical energy. The panels 90 and heat source arrangement 10 may be appropriately mounted together by a suitable mounting support and end plate arrangement 94. A heat source system using a heat source arrangement as described above in FIGS. 1 and 2 with 24 heat source devices 1.5 inches in diameter arranged in a helical pattern, each having about 2,750 curies of plutonium-238, may produce about 22 kilowatts of thermal energy with about 290 silicon germanium thermoelectric converters producing about 145 watts of electric power at 28 to 30 volts at a hot shoe temperature of about 1000° C. for a period of 12 years or more. Such a heat source and thermoelectric generator system may be about 20 inches long, 12 inches in diameter and weigh about 75 pounds.

What is claimed is:

1. A radioisotope heat source system for space and reentry vehicles comprising a plurality of spherical heat source devices, each device including a spherical radioisotope core and an outer impact resistant layer enclosing said spherical core; means for supporting said spherical heat source devices in elongated tubular array about and out of alignment with a longitudinal central axis and in a plurality of levels parallel to and spaced from each other along said axis, with each of said spherical heat source devices of each of said levels being spaced radially equidistant from said axis and angularly offset from those heat source devices of an adjacent level; and a tubular wall enclosing and encircling all of said heat source devices and said supporting means.

2. The system of claim 1 including at least three heat source devices in each level.

3. The system of claim 1 wherein a heat source device in each level lies in a helical path about said tubular axis.

4. The system of claim 1 wherin said supporting means includes a tubular member having recesses for receiving said heat source devicess.

5. The system of claim 4 wherein said tubular member is formed of a plurality of stacked tubular segments with said recesses at the joints of said segments.

6. The system of claim 4 including a center post along the axis of said tubular member.

7. The system of claim 1 wherein said supporting means is a solid cylinder having a plurality of spaced apart bores extending radially inwardly from the periphery thereof and helically arranged thereabout, said heat source devices are positioned in separate bores, and including retaining means for maintaining each of said heat source devices in its respective bore.

8. The system of claim 1 wherein said containing and conveying means includes a reentry ablator enclosing said supporting means and said heat source devices.

9. The system of claim 8 wherein said ablator and supporting means are of graphite.

10. The system of claim 1 including means for contaitaining said supporting means and heat source devices and for conveying thermal energy therefrom.

11. The system of claim 10 wherein said containing and conveying means includes means for converting thermal energy produced by said heat source devices to electrical energy.

12. The system of claim 11 wherein said converting means includes a plurality of thermoelectric converters arranged about and spaced from said supporting means and said heat source devices.

References Cited

UNITED STATES PATENTS

| | | | |
|---|---|---|---|
| 3,005,766 | 10/1961 | Bartnoff | 136—202 UX |
| 3,262,859 | 7/1966 | Winsche | 176—73 |
| 3,387,148 | 6/1968 | Janner et al. | 136—202 X |
| 3,451,641 | 6/1969 | Leventhal | 136—202 |
| 3,463,702 | 8/1969 | D'Eye et al. | 176—91 SP |
| 3,530,009 | 9/1970 | Linkous et al. | 136—202 |

CARL D. QUARFORTH, Primary Examiner

E. E. LEHMANN, Assistant Examiner

U.S. Cl. X.R.

136—20 S; 176—91 SP; 250—106 S